April 21, 1931. C. L. JOHNSON 1,801,628
LOCK MECHANISM
Filed June 7, 1926 2 Sheets-Sheet 1
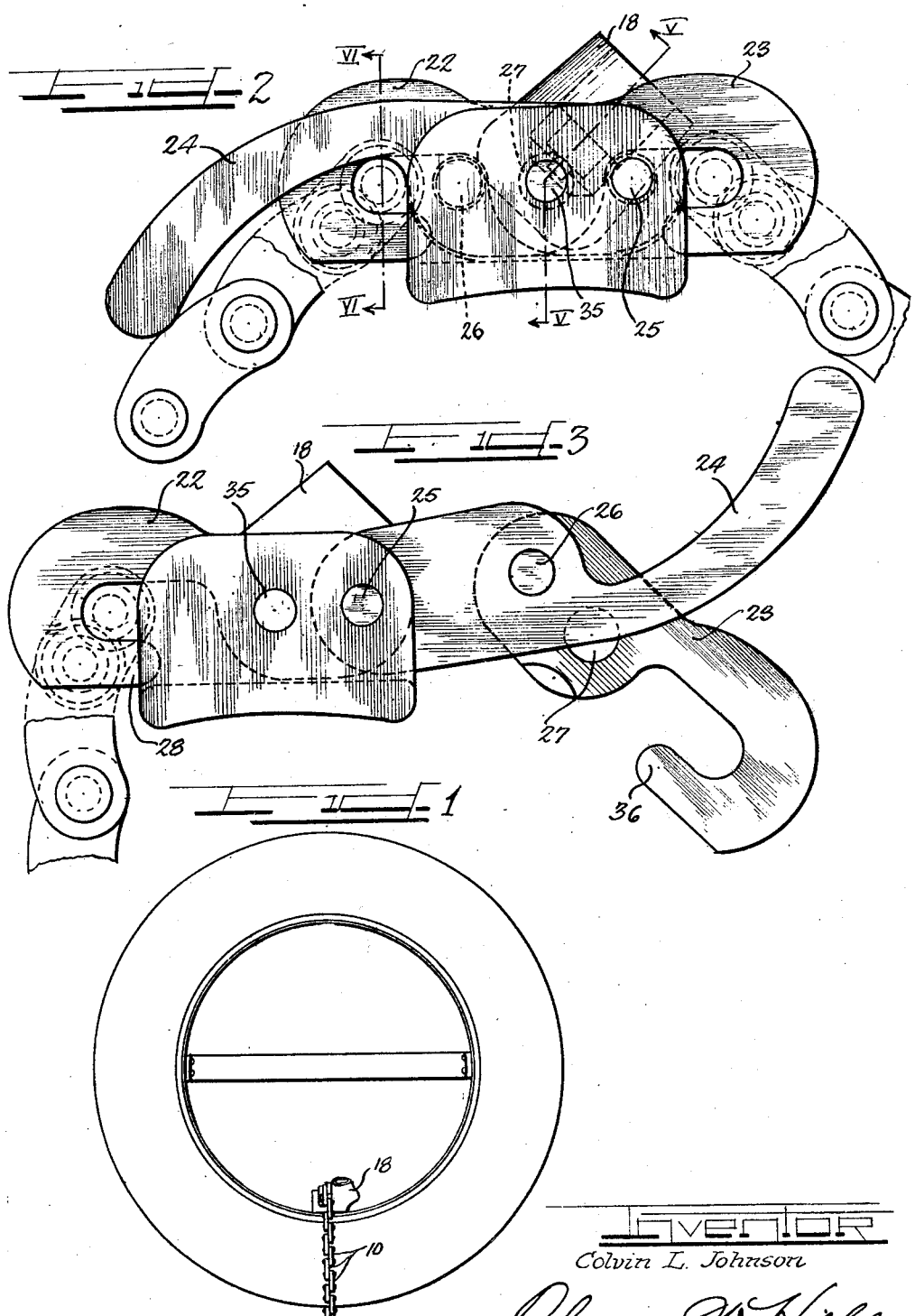

April 21, 1931. C. L. JOHNSON 1,801,628
LOCK MECHANISM
Filed June 7, 1926  2 Sheets-Sheet 2
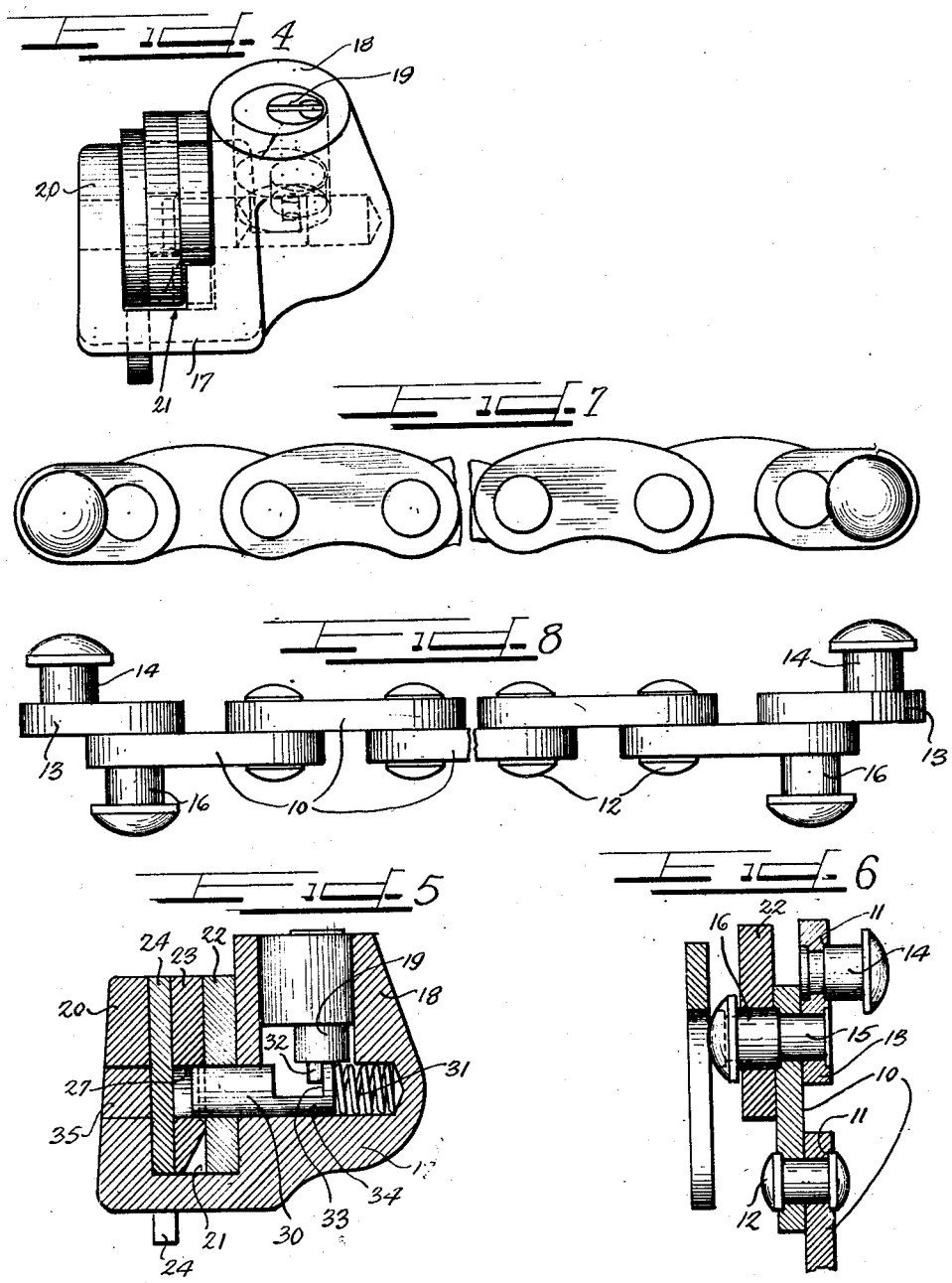

Patented Apr. 21, 1931

1,801,628

UNITED STATES PATENT OFFICE

COLVIN L. JOHNSON, OF ST. LOUIS, MISSOURI, ASSIGNOR, BY MESNE ASSIGNMENTS, TO FRANK C. WEBB, OF ST. LOUIS, MISSOURI

LOCK MECHANISM

Application filed June 7, 1926. Serial No. 114,093.

This invention relates to an improved form of chain and a locking mechanism therefor adapted to secure objects, such as tires, gates, etc. against unauthorized opening or removal.

It is an object of this invention to provide an improved form of chain having a plurality of length adjustments, together with a hardening treatment adapted to produce an extremely hard surface to resist cutting tools.

Another object of this invention is to produce a chain tightening mechanism adapted to take up the slack of a chain to prevent rattling thereof and to increase the difficulty of applying cutting tools thereto.

A further object of the invention is to provide a chain tightener and lock wherein one end of the chain may be semi-permanently locked to the tightener and the other end of the chain can be readily detached or locked thereto without the use of a key except for the unlocking operation.

Other and further important objects of this invention will be apparent from the disclosures in the specification and the accompanying drawings.

This invention (in a preferred form) is illustrated in the drawings and hereinafter more fully described.

On the drawings:

Figure 1 is a view of a spare tire and carrier, with a device embodying the features of this invention applied thereto.

Figure 2 is a side view of the tightening mechanism in locked position.

Figure 3 is a view similar to Fig. 2 showing the tightening mechanism in open or disengaged position.

Figure 4 is an end view showing the locking cylinder in outline.

Figure 5 is a section through the locking mechanism taken on the line V—V of Fig. 2.

Figure 6 is a section on the line VI—VI of Fig. 2.

Figure 7 is a side view of the chain.

Figure 8 is a top view of the chain.

As shown on the drawings:

A chain is built up of a series of curved links 10 having counterbored shoulders 11 to receive rivets 12, the counterbores being provided to prevent cutting off the rivet heads and driving out the rivets to open the chain. End links 13 are provided with headed studs 14, the rivets 15 holding the links 13 to the chain being of extra length to pass through a stud 16 outwardly similar to the studs 14. The two studs shown on each end of the chain provide a plurality of lengths for the chain, any of which may be chosen to suit the varying cross sectional areas of different makes of tires of the same nominal sectional diameter. The links 10 are curved as mentioned to lie snugly on the tire and rim when bent therearound in locking position.

The links and rivets are of material suitable to be hardened, which is done after assembly in order to make both the links and rivets proof against filing, drilling or sawing in attempt to cut the chain. The entire chain is also plated with cadmium to resist rust.

The chain lock shown in Figures 2 to 5 also serves as a chain tightener to take up the slack of the chain to prevent rattling thereof. The tightening mechanism comprises a body 17 having an outstanding boss 18 for a cylinder lock 19 and an upwardly extending arm 20 defining a channel 21 to receive the two chain hook members 22 and 23 and the tightening lever 24. The tightening lever or toggle 24 is pivoted to the body 17 through the upwardly extending arm 20 by means of the pin 25, the chain hook 23 being pivoted to the lever 24 at 26. The aperture 27 in the chain hook 23 is for the locking bar and is best shown in Fig. 3.

The left hand chain hook 22 is also pivoted on the pin 25, and the tip 28 of the hook is of such length as to extend into the channel 21 of the body, this hook being semi-permanently locked in this position by the locking mechanism to be later described, in order that the chain may be held semi-permanently attached at one end to the hook 22, the engaging and disengaging of the chain while being used about a tire being always performed at the hook 23. It is only necessary to disengage the chain at the hook 22 when it is desired to change the chain to provide for a change from one button or stud to the other or by the substitution of a new chain when the length adjustments of the old chain are insufficient.

As shown in Figure 5, the locking mechanism proper comprises a sliding bolt 30 outwardly urged by a spring 31 and operated by an eccentric pin 32 on the bottom of the cylinder lock 19, the pin operating in a slot 33 in the bolt. This slot is purposely made wide enough to permit the bolt to be pushed back beyond its normal retracted position to release the hook 22, the normal retracted position being only sufficient to release the hook 23 while still holding the hook 22. As shown in Figure 5, the right side of the hook 23 below the aperture 27 is beveled off so that forcing down the lever and hook will push back the bolt to render the device self locking without the use of the key and cylinder lock.

While the passage 34 in which the bolt slides may be drilled from either side and plugged, it has been shown as drilled through the arm 20 and closed by the plug 35 which is suitably secured in place. This plug is not essential however as the blank surface of the lever 24 in locked position prevents access to the lock bolt.

After the various rivets have been driven, the locking device is hardened and plated as described in connection with the chain.

In the operation of the device, the chain is first engaged at one end in the hook 22 which is then closed by pushing back the bolt by a suitable hooked tool. The chain is then wrapped around the tire and engaged with the other hook 23 when in open position, either of the two buttons or studs being used as required. Pulling the lever 24 over into the position of Figure 2 takes up the slack of the chain and forces the hook down over the bolt until the bolt snaps into the aperture 27. In this position, the tip 36 of the hook 23 rests on the bottom of the channel and gives a lever arm holding the lever 24 down because the pivot 26 between the lever and hook comes to the left of the bolt aperture 27 in the hook while the lever pivot pin 25 is to the right of the bolt.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination a body having a channel thereon, a sliding bolt projecting into said channel, a chain hook normally engaged on said bolt in retracted position, a second chain hook adapted to be pushed down over the free end of the bolt while in a projected position to retract the same, said hook having an aperture for the bolt to snap into, to lock said hook.

2. A chain lock comprising a plurality of chain engaging members, a locking bolt for engagement with one of said members to normally maintain said member in a locked position, manually operative means for actuating said other members to move same into locked engagement with said locking bolt, and key operated means for actuating said locking bolt to disengage same from locked engagement with said latter member.

3. A chain lock comprising a pair of chain engaging members, a locking bolt for normally engaging one of said members to maintain the same in a locked position, means for moving said other member to engage said locking bolt for locking said member, and key operative means for actuating said bolt for disengaging said latter member from its locked position.

4. A chain lock comprising a pair of chain engaging members, a locking bolt for engagement with said members for maintaining said members in a locked position, means for enabling one of said members to engage said locking bolt for normally locking said member in position, and means for actuating said other member for locking and unlocking said member independently of first said member.

5. In combination, a chain composed of a series of links having shouldered openings therein, rivets arranged to fit in said shouldered openings for securing said links to each other, outstanding studs secured to the links, and locking mechanism adapted to engage said studs.

In testimony whereof I have hereunto subscribed my name.

COLVIN L. JOHNSON.